US011014197B2

United States Patent
Ji et al.

(10) Patent No.: US 11,014,197 B2
(45) Date of Patent: May 25, 2021

(54) PICOSECOND-NANOSECOND LASER COMPOSITE ASYNCHRONOUS CERAMICS POLISHING METHOD

(71) Applicant: BEIJING UNIVERSITY OF TECHNOLOGY, Beijing (CN)

(72) Inventors: Lingfei Ji, Beijing (CN); Ximin Zhang, Beijing (CN); Wenhao Wang, Beijing (CN); Tianyang Yan, Beijing (CN); Rui Ma, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 16/727,726

(22) Filed: Dec. 26, 2019

(65) Prior Publication Data
US 2020/0269355 A1    Aug. 27, 2020

Related U.S. Application Data

(63) Continuation of application No. PCT/CN2019/086937, filed on May 15, 2019.

(30) Foreign Application Priority Data

Dec. 18, 2018 (CN) .......................... 201811546932.0

(51) Int. Cl.
*B23K 26/354* (2014.01)
*B23K 26/00* (2014.01)

(52) U.S. Cl.
CPC ........ *B23K 26/354* (2015.10); *B23K 26/0006* (2013.01)

(58) Field of Classification Search
CPC .... B23K 26/0624; B23K 26/04; B23K 26/40; B23K 26/361; B23K 26/0006;
(Continued)

(56) References Cited

U.S. PATENT DOCUMENTS 5,742,026 A      4/1998  Dickinson, Jr.
2016/0318122 A1*  11/2016  Ota ................... B23K 26/0624

FOREIGN PATENT DOCUMENTS

CN    101524819 A  *  9/2009
CN    101524819 A      9/2009
(Continued)

OTHER PUBLICATIONS

Dimitris Karnakis et al., "High quality laser milling of ceramics, dielectrics and metals using nanosecond and picosecond lasers" Proceedings SPIE 6106, Photon Processing in Microelectronics and Photonics V; 610604; (Mar. 2006).
(Continued)

*Primary Examiner* — Christopher M Koehler
*Assistant Examiner* — Chris Q Liu
(74) *Attorney, Agent, or Firm* — J.C. Patents

(57) ABSTRACT

The invention disclose a picosecond-nanosecond laser composite asynchronous ceramics polishing method. First, a picosecond laser is used to scan and irradiate the ceramic surface along the scanning path. At the same time, ceramic surface is initially flattened and the electronic state of materials is removed by picosecond laser to produce micro-nanoparticles. Micro-nanoparticles exist as ionized state in the adjacent space region of irradiated ceramics surface. Then, low energy density nanosecond laser is used according to a preset time to irradiate and melt these micro-nanoparticles which can easily form a dense and smooth fine crystal melting layer to achieve the polishing effect. The present disclosure fixes the generation of micro-cracks and pores in traditional laser polishing process. It overcomes the shortcomings of traditional laser polishing such as large thermal influence zone, easy to generate micro-cracks and pores on the surface, etc. High efficiency and high precision
(Continued)

submicron level fine polishing with very low material removal amount is realized.

3 Claims, 5 Drawing Sheets

(58) Field of Classification Search
CPC .............. B23K 26/032; B23K 26/0736; B23K 26/3576; B23K 26/53; B23K 26/0626; B23K 26/364; B23K 26/389; B23K 26/0604; B23K 26/0608; B23K 26/08; B23K 26/082; B23K 26/127; B23K 26/324; B23K 26/34; B23K 26/342; B23K 26/354; B23K 26/355; B23K 26/38; B23K 26/402; B23K 26/703; B23K 26/03; B23K 26/034; B23K 26/044; B23K 26/048; B23K 26/062; B23K 26/0622; B23K 26/0643; B23K 26/0652; B23K 26/0676; B23K 26/0823; B23K 26/083; B23K 26/0838; B23K 26/0869; B23K 26/0876; B23K 26/0884; B23K 26/10; B23K 26/1224; B23K 26/123; B23K 26/125; B23K 26/21; B23K 26/244; B23K 26/26; B23K 26/32; B23K 26/359; B23K 26/36; B23K 26/382; B23K 26/55; B23K 26/704

USPC ............ 219/121.69, 121.85, 121.68, 121.63, 219/121.64, 121.65, 121.66, 121.73

See application file for complete search history.

(56) References Cited

FOREIGN PATENT DOCUMENTS

| | | | | |
|---|---|---|---|---|
| CN | 104109860 | A | * | 10/2014 |
| CN | 104109860 | A | | 10/2014 |
| CN | 105583524 | A | | 5/2016 |
| CN | 105583524 | B | * | 5/2016 |
| CN | 106425125 | A | | 2/2017 |
| CN | 106425125 | B | * | 2/2017 |
| CN | 107498176 | A | * | 12/2017 |
| CN | 108890138 | A | | 11/2018 |
| CN | 107378276 | B | | 1/2019 |
| CN | 109414076 | A | | 3/2019 |
| CN | 107498176 | B | | 5/2019 |
| WO | WO-2014023798 | A2 | * | 2/2014 ........... B23K 26/361 |

OTHER PUBLICATIONS

The International Search Report of corresponding International application No. PCT/CN2019/086937, dated Sep. 19, 2019.

* cited by examiner

PICOSECOND-NANOSECOND LASER COMPOSITE ASYNCHRONOUS CERAMICS POLISHING METHOD

CROSS-REFERENCE TO RELATED APPLICATION

The present application is a continuation application of International Application No. PCT/CN2019/086937 filed on May 15, 2019 which claims priority to Chinese Patent Application No. 201811546932.0 filed on Dec. 18, 2018. The disclosures of the aforementioned applications are hereby incorporated by reference in their entireties.

TECHNICAL FIELD

The present disclosure relates to the field of laser polishing on ceramic material surface, especially relates to a method of high precision laser polishing on alumina ceramic surface at sub-micron level.

BACKGROUND ART

Engineering ceramics are mainly made of alumina ($Al_2O_3$) and zirconia ($ZrO_2$), which are used in thick film integrated circuits and ceramic structures. Alumina, zirconia and other engineering ceramics have good conductivity, mechanical strength and high temperature resistance which are widely used. Because of its superior performance, the application in modern society has been more and more extensive, it meets the needs of daily use and special performance. However, conventional mechanical polishing method for ceramic materials has long processing time and low processing efficiency. In addition, mechanical processing is mostly contact processing, which is easy to produce mechanical damage, subsurface crack and other defects to the ceramics surface. At the same time, it is difficult to achieve high-precision three-dimensional surface polishing due to its limited processing principle. As a non-contact processing method, laser polishing will not produce compressive stress on the surface of workpiece, which has high processing efficiency, high degree of freedom and low requirements for processing environment. At present, conventional laser polishing technology mostly adopts the medium and long pulse thermal polishing, which uses thermal effect of the laser to remove the material through melting and evaporation of the substrate. This method produces a large heat-affected zone, thermal crack and ablation obviously, which is not conducive to the processing of hard and brittle materials. Chinese patent 201710651327.9 and 201710652088.9 adopts excimer laser polishing for ceramic polishing, the ceramic is polished by ablating and vaporizing, the roughness Ra decreased from 0.94 μm to 0.91 μm. The roughness reduction rate is about 4% which is not obvious, and the original ceramics must be submicron fine ceramics. Dimitris Karnakis uses single 1064 nm picosecond laser to reduce the surface roughness of alumina ceramics by multiple scanning irradiation, the roughness decreases with the machining depth increases. However, this method belongs to the laser milling process, which requires a large milling depth and completely changes the original surface morphology of the material. It does not belong to fine polishing (Karnakis D, Rutterford G, Knowles M, et al., Laser micro-milling of ceramics, dielectrics and metals using nanosecond and picosecond lasers[J]. Proceedings of SPIE—The International Society for Optical Engineering, 2006, 6106.). Chinese patent 201810785012.8 uses femtosecond laser polished ceramic composites. The surface roughness after polishing is 1.4 μm, which does not reach the sub-micron level. Moreover, the essence of a single ultra-fast laser polishing is material micro-removal, so it is difficult to effectively repair the original pores, cracks and other defects of ceramic materials. The present disclosure adopts composite asynchronous polishing technology of picosecond laser and nanosecond laser to realize ceramic fine polishing of materials under the premise of no material surface removal amount and no damage to the surface morphology. Firstly, the ceramic materials are irradiated by picosecond laser. At the same time, ceramic surface is initially flattened and the electronic state of materials is removed by picosecond laser to produce micro-nanoparticles with high surface activity.

Then, low energy density nanosecond laser is used to irradiate and melt these micro-nanoparticles with high surface activity, which can easily form a dense and smooth fine crystal melting layer. According to the generation and growth mechanism of particles, the time difference between two polishing is controlled reasonably. The present disclosure overcomes the generation of micro-cracks and pores in traditional laser polishing process, and realizes laser fine polishing without damaging the material surface geometry with very low material removal amount.

SUMMARY

In view of the existing ceramic polishing technology, it is easy to produce micro-cracks and pores, the influence zone of thermal/mechanical stress is large, the material removal amount is large and the surface morphology is easy to damage. To cure the above problems, the present disclosure provides a picosecond-nanosecond laser composite asynchronous ceramic polishing method, which can effectively overcome the above problems and achieve a high precision submicron polishing effect without damaging the surface material geometry.

To achieve the above purposes, a picosecond-nanosecond laser composite asynchronous ceramic polishing method comprising the following steps:

(1) first, a picosecond laser is used to scan and irradiate a ceramic surface along a scanning path; after irradiation with the picosecond laser, microscopic protrusions on the ceramic surface are removed to achieve a preliminary flattening, and micro-nanoparticles with high surface activity are generated which are distributed on the ceramic surface; an irradiation energy density of the picosecond laser is higher than 50%-300% of a removal threshold of the ceramic substrate; an average power of the picosecond laser is set to be 30 W-70 W, and a repetition frequency is 10000 KHz-100000 khz;

(2) a nanosecond laser is activated after a time interval t (t is 50 μs~500 μs), the nanosecond laser follows the scanning path of the picosecond laser to process tracking radiation for the micro-nanoparticles generated by the picosecond laser with same scanning speed; after irradiation, the micro-nanoparticles are melt producing a dense smooth layer of fine crystals covering the ceramic surface; an energy density of the nanosecond laser is between a ceramic micro-nanoparticle melting threshold of the nanosecond laser and a ceramic micro-nanoparticle vaporization threshold of the nanosecond laser, and is lower than the melting threshold of ceramic substrate; an average power of the nanosecond laser is set to be 3 W-15 W, and a repetition frequency is set to be 50 KHz-100 KHz.

As a further improvement, the picosecond laser adopts zero defocusing scanning irradiation, while the nanosecond laser adopts positive defocusing tracking irradiation, a defocusing amount is 0.01 mm-1 mm.

As a further improvement, a controller is used to set the time interval t of picosecond laser and nanosecond laser initiation, and t is the sum of three factors which are nanoscale clusters explosion delay sputtering time of picosecond laser action point, the time of nanoscale clusters aggregate and grow into micro-nanoparticles, and the time for spatial redistribution of micro-nanoparticles. t=50 μs-500 μs.

As a further improvement, picosecond laser scanning path is planned by computer, and the scanning speed is set as 300 mm/s-1000 mm/s, the gap of scanning path is set as 0.01 mm-0.5 mm.

Compared with existing technology, the beneficial effect of the invention is: as a picosecond and nanosecond laser composite polishing process, the method of the invention is different from conventional single laser polishing and double beam laser polishing process. The invention relates to an asynchronous polishing process which organically combines picosecond laser removal mechanism with nanosecond laser thermal action mechanism. Firstly, process picosecond laser scanning irradiation to remove the microscopic protrusions on ceramic surface. The mechanism is that the absorption of picosecond laser by ceramic material causes enough conduction electrons, which deposit in interior and break through the critical plasma density, then a coulomb explosion occurs, causing the removal of material damage.

During removal, a large number of clusters are sputtered out with the expansion and condensation of plasma, the clusters aggregate to form nanoscale ceramic particles. There is no obvious thermal influence zone during the process, and the ceramic surface can be initially flattened. More importantly, the mechanism of removing electronic state of ceramic materials by picosecond laser resulted in the generation of micro-nanoparticles with high surface activity. Secondly, a nanosecond laser with small power is used for tracking irradiation on evenly distributed micro-nanoparticles. Since the micro-nanoparticles has high surface activity, low melting point and much lower laser energy density required for melting than ceramic substrate, the irradiation of nano-laser can only cause the melting of micro-nanoparticles, but will not produce significant thermal impact on ceramic substrate. These high surface activity nano-particles are similar to ceramic substrate, it is melted by nanosecond laser to form a dense and smooth layer covering the substrate surface. The original micro-cracks and pores of ceramic materials were eliminated. The invention effectively utilizes part of the material whose ceramic surface is removed by preliminary flattening during the process of picosecond laser irradiation to form micro-nano particles, which are melted to cover the ceramic material surface, so the material removal amount is extremely low. At the same time, according to the generation and growth time of the micro-nanoparticles, the invention also effectively controls the time interval of two laser effects, during this time interval, the fine crystals produced by the thermal action of nanosecond laser have finer grains, denser tissues, more uniform distribution and better mechanical properties. In the invention, two laser action processes is indispensable and the sequence cannot be changed. The laser used in the invention is not limited to picosecond laser and nanosecond laser, and all ultrafast laser and medium-long pulsed laser conforming to the action mechanism of the invention are within the protection range of the invention.

BRIEF DESCRIPTION OF THE APPENDED DRAWINGS

PREFERRED EMBODIMENT

The invention will be described in detail accompanied with FIGS. 2a and 2b and FIGS. 3a and 3b.

Embodiment 1

Figure 1A:
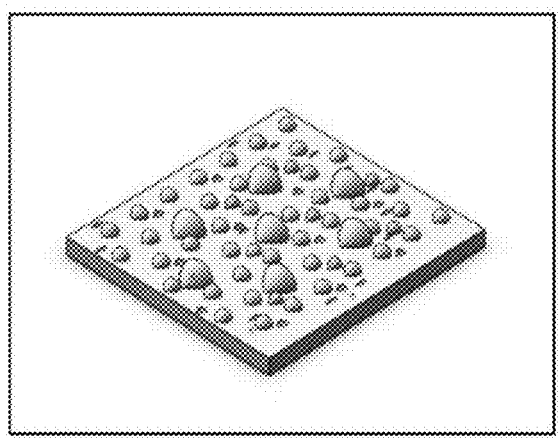
FIG. 1a is a microscopic diagram of ceramic materials surface (microscopic surface is uneven).
Figure 1B:
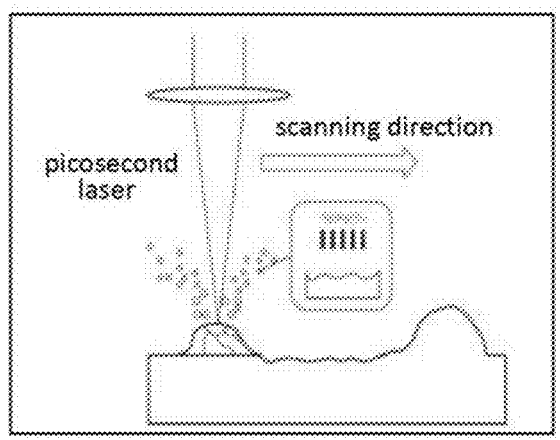
FIG. 1b is a schematic diagram of ceramic material removal by picosecond laser irradiation and sputtering diagram of excited micro-nanoparticles.
Figure 1C:
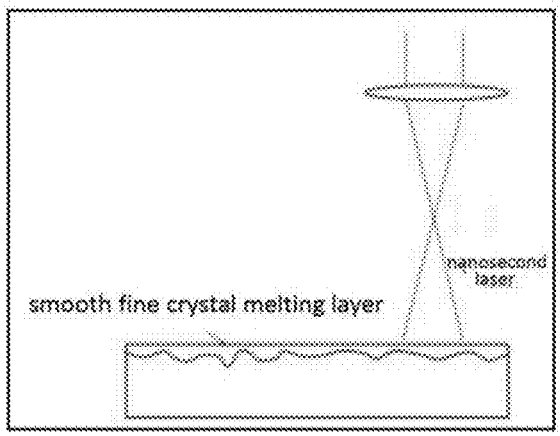
FIG. 1c is a schematic diagram of nanosecond laser irradiation of melting micro-nanoparticles.
Figure 1D:
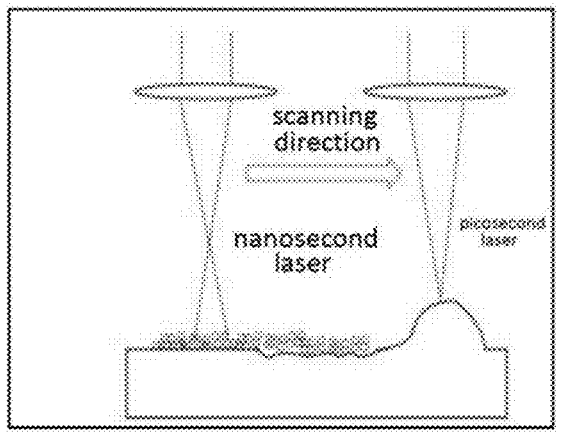
FIG. 1d is a schematic diagram of the formation of smooth fine crystal melting layer after polishing.
Figure 2A:
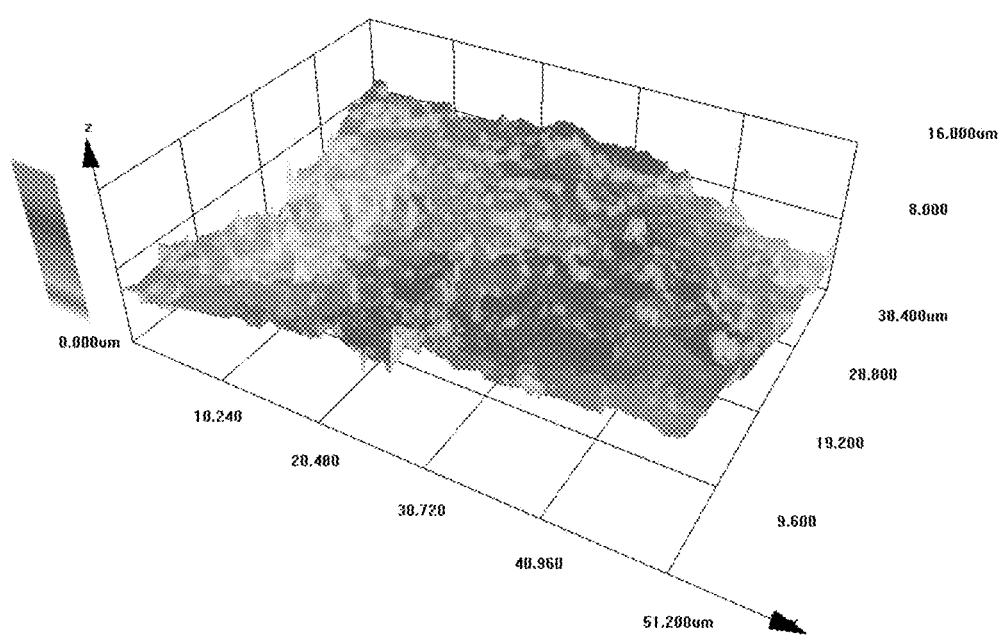
FIG. 2a shows the surface topography of ceramic material before polishing in embodiment 1.
Figure 2B:
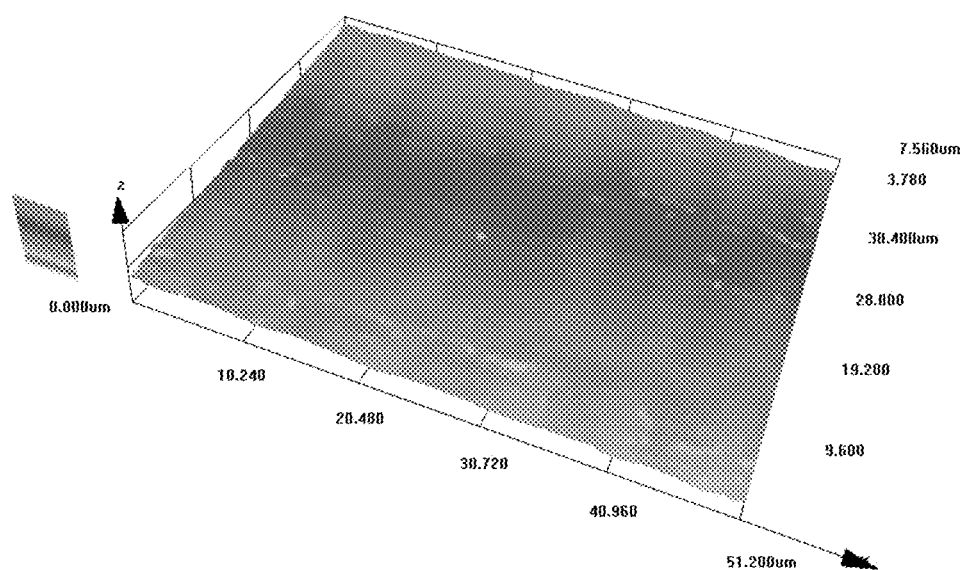
FIG. 2b shows the surface topography of ceramic material after polishing in embodiment 1.

Polishing of 95% alumina ceramic substrate, first, a picosecond laser with 60 W average power, 100000 KHz repetition frequency and 0 defocused volume is adopted for scanning and irradiation. The scanning speed is 400 mm/s, and the gap of scanning path is 0.05 mm. It is used for removing microscopic protrusions on micro surface of materials and for initiating sputtering of micro-nanoparticles. After 50 ns, nanosecond laser with 5 W average power, 100 KHz repetition frequency and +0.3 mm defocused volume is activated, it follows the scanning path of picosecond laser and process tracking radiation for micro-nanoparticles generated by picosecond laser with same scanning speed. It is used for melting the micro-nanoparticles and produce a dense smooth layer of fine crystals covering the ceramic surface. After the polishing process, material is removed from processing platform, laser confocal microscope is used for measuring the surface morphology. Roughness Ra decreased from 1.70 μm to 0.68 μm, and the 3D surface morphology before and after polishing is shown in FIGS. 2a and 2b.

Embodiment 2

Figure 3A:
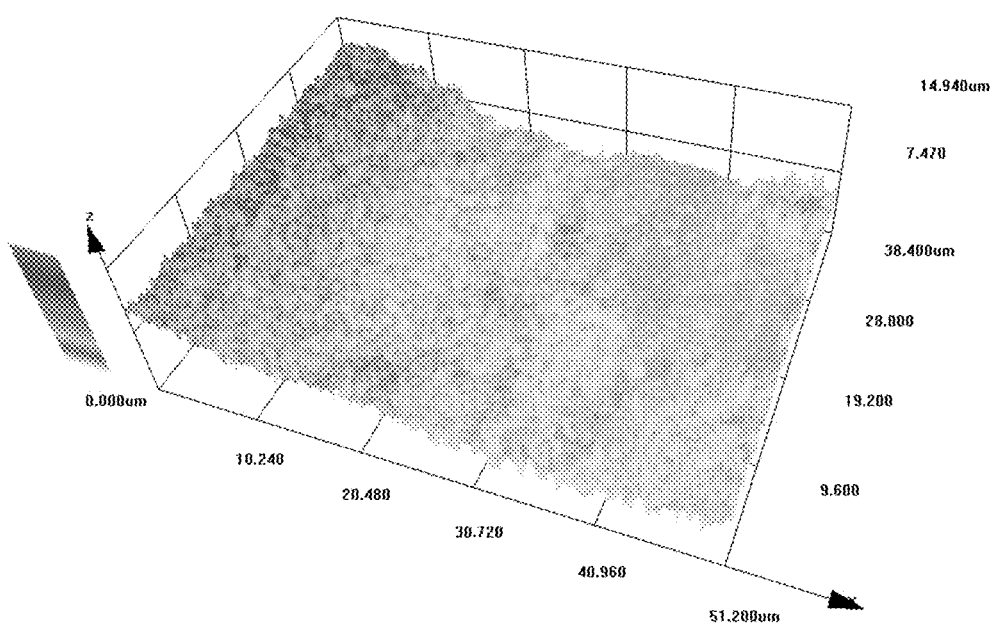
FIG. 3a shows the surface topography of ceramic material before polishing in embodiment 2.
Figure 3B:
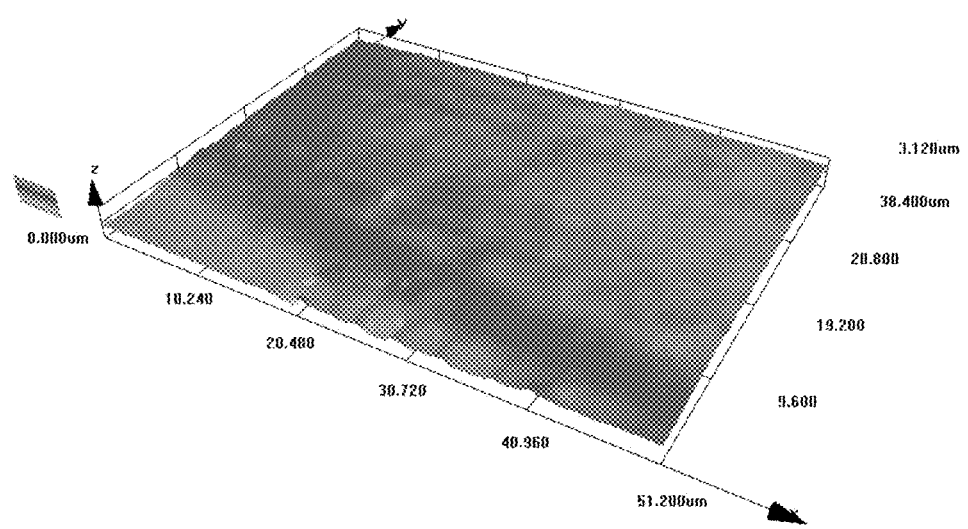
FIG. 3b shows the surface topography of ceramic material after polishing in embodiment 2.

Polishing of Zirconia ceramic substrate, first, a picosecond laser with 30 W average power, 50000 KHz repetition frequency and 0 defocused volume is adopted for scanning and irradiation. The scanning speed is 1000 mm/s, and the gap of scanning path is 0.01 mm. It is used for removing microscopic protrusions on micro surface of materials and for initiating sputtering of micro-nanoparticles. After 50 ns, nanosecond laser with 3 W average power, 50 KHz repetition frequency and +0.5 mm defocused volume is activated, it follows the scanning path of picosecond laser and process tracking radiation for micro-nanoparticles generated by picosecond laser with same scanning speed. It is used for melting the micro-nanoparticles and produce a dense smooth layer of fine crystals covering the ceramic surface. After the polishing process, material is removed from processing platform, laser confocal microscope is used for measuring the surface morphology. Roughness Ra decreased from 1.30 µm to 0.52 µm, and the 3D surface morphology before and after polishing is shown in FIGS. 3a and 3b.

Embodiment 3

Polishing of aluminum nitride substrate, first, a picosecond laser with 55 W average power, 100000 KHz repetition frequency and 0 defocused volume is adopted for scanning and irradiation. The scanning speed is 300 mm/s, and the gap of scanning path is 0.05 mm. It is used for removing microscopic protrusions on micro surface of materials and for initiating sputtering of micro-nanoparticles. After 100 µs, nanosecond laser with 14 W average power, 100 KHz repetition frequency and +0.1 mm defocused volume is activated, it follows the scanning path of picosecond laser and process tracking radiation for micro-nanoparticles generated by picosecond laser with same scanning speed. It is used for melting the micro-nanoparticles and produce a dense smooth layer of fine crystals covering the ceramic surface. After the polishing process, material is removed from processing platform, laser confocal microscope is used for measuring the surface morphology. Roughness Ra decreased from 1.81 µm to 0.65 µm.

The method above are only preferred embodiments of the invention and are not intended to limit the invention, which may be subject to various modifications technicians in the field. Any modification, substitution, improvement, etc. made within the spirit and principles of the invention shall be included in the protection scope of the invention.

What is claimed is:

1. A picosecond-nanosecond laser composite asynchronous ceramic polishing method comprising the following steps:
   (1) scanning and irradiating a ceramic surface of a ceramic substrate along a scanning path by a picosecond laser, wherein the scanning and irradiating by the picosecond laser removes microscopic protrusions on the ceramic surface to achieve a preliminary flattening, and generates micro-nanoparticles with high surface activity distributed on the ceramic surface, an average power of the picosecond laser is set to be 30 W-70 W, and a repetition frequency is 10000 kHz-100000 kHz;
   (2) activating a nanosecond laser after a time interval t, wherein t is in the range of 50 µs to 500 µs, and irradiating the ceramic surface of the ceramic substrate by the nanosecond laser follows the scanning path of the picosecond laser to process tracking irradiation for the micro-nanoparticles generated by the picosecond laser with same scanning speed as that of the picosecond laser in step (1), so that the micro-nanoparticles are melt producing a dense smooth layer of fine crystals covering the ceramic surface; an energy density of the nanosecond laser is between a threshold energy density for the nanosecond laser to melt ceramic micro-nanoparticles and a threshold energy density for the nanosecond laser to vaporize ceramic micro-nanoparticles, and is lower than a threshold energy density for the nanosecond laser to melt the ceramic substrate; an average power of the nanosecond laser is set to be 3 W-15 W, and a repetition frequency is set to be 50 kHz-100 kHz.

2. A picosecond-nanosecond laser composite asynchronous ceramic polishing method according to claim 1, wherein the picosecond laser adopts zero defocusing scanning irradiation, while the nanosecond laser adopts positive defocusing tracking irradiation, a defocusing amount is 0.01 mm-1 mm.

3. A picosecond-nanosecond laser composite asynchronous ceramic polishing method according to claim 1, wherein a controller is used to set the time interval t for activating the nanosecond laser.

* * * * *